UNITED STATES PATENT OFFICE.

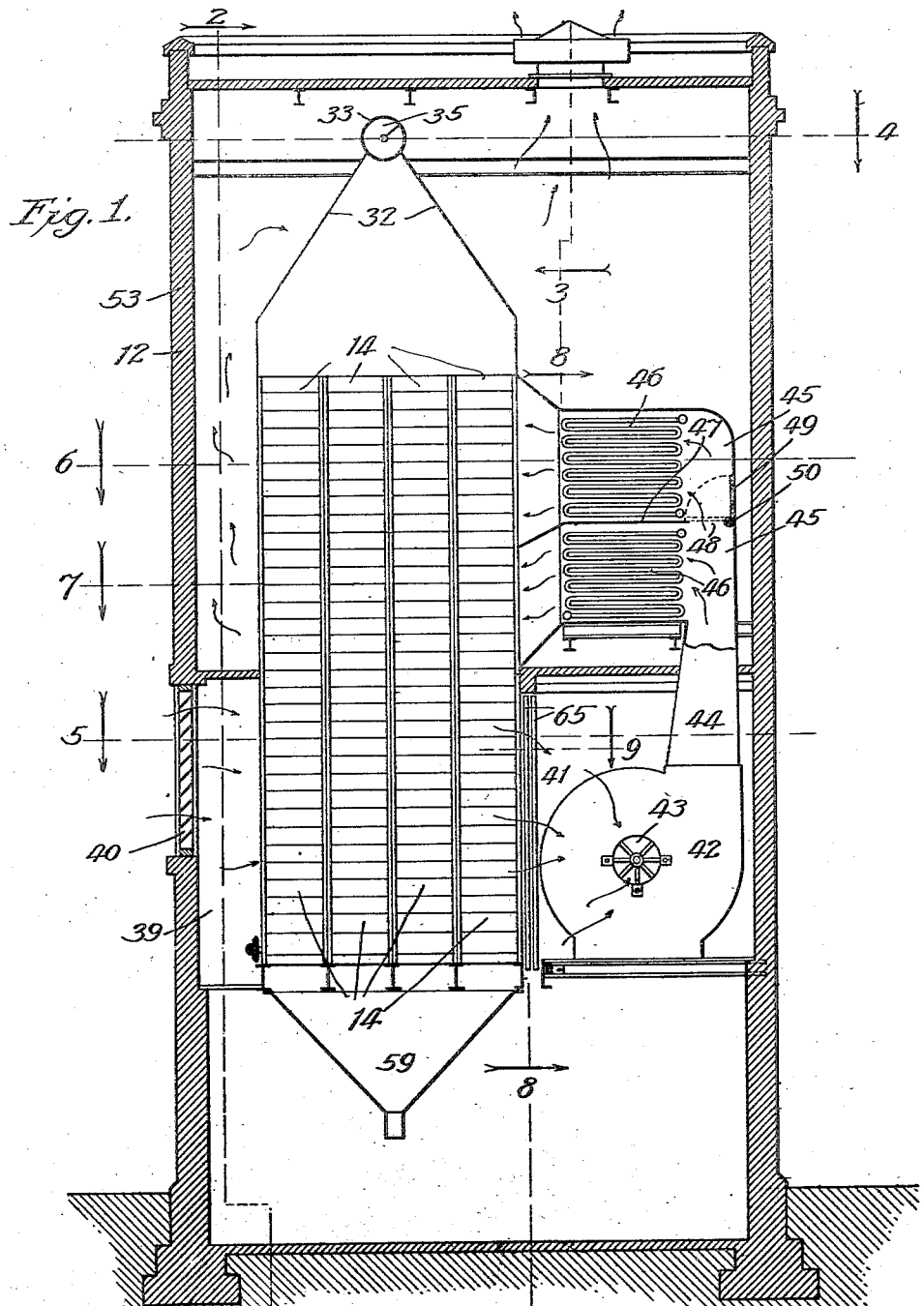

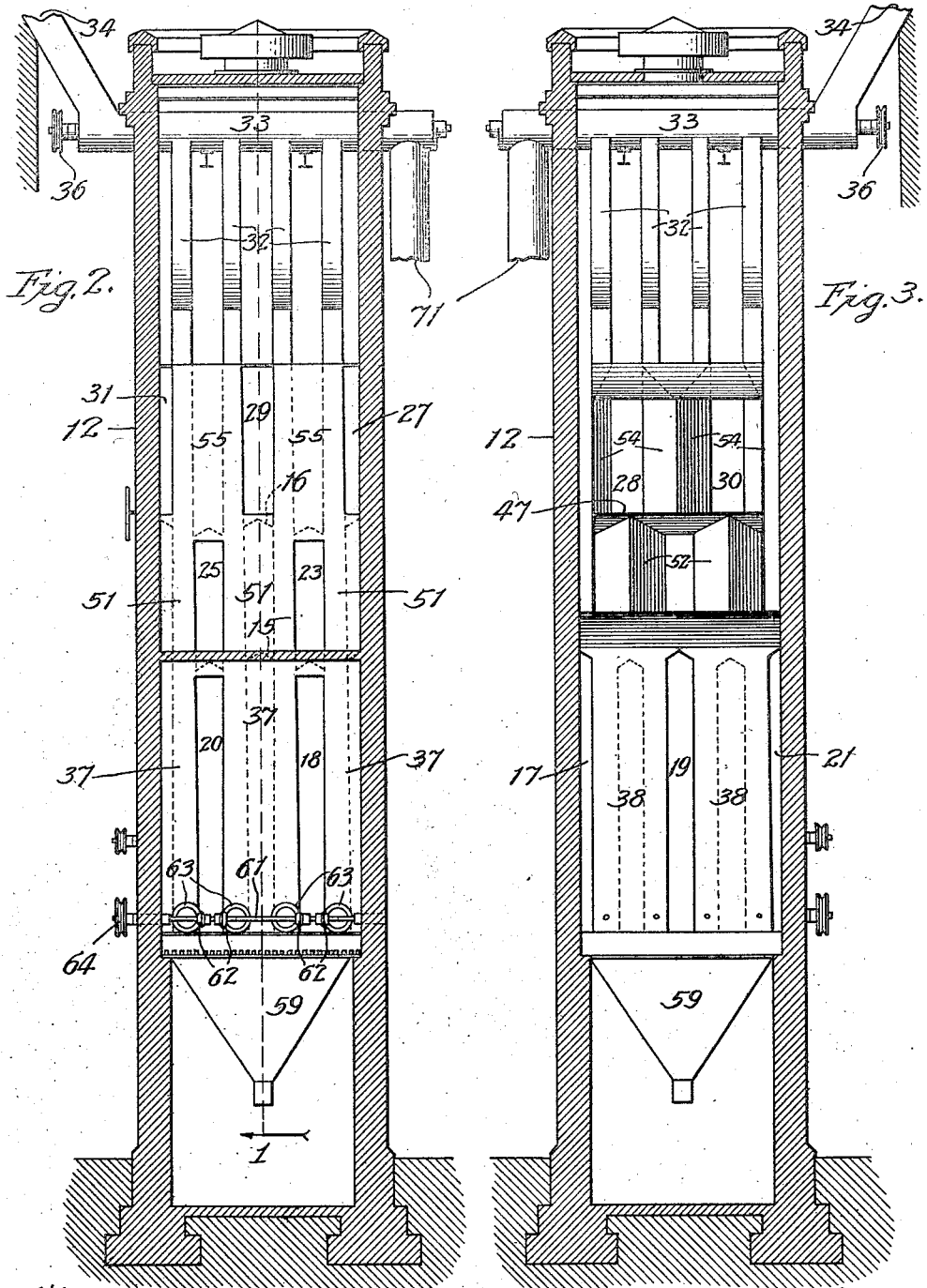

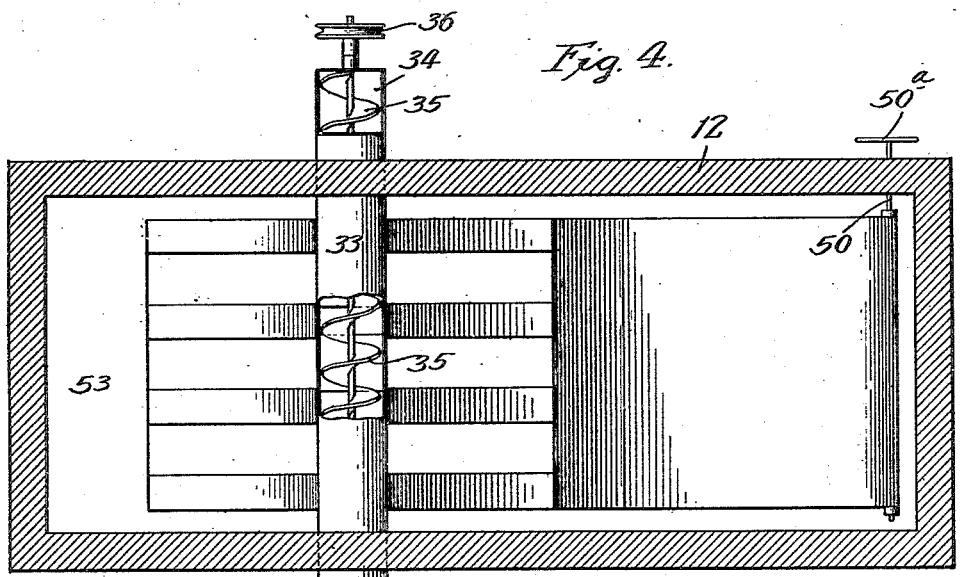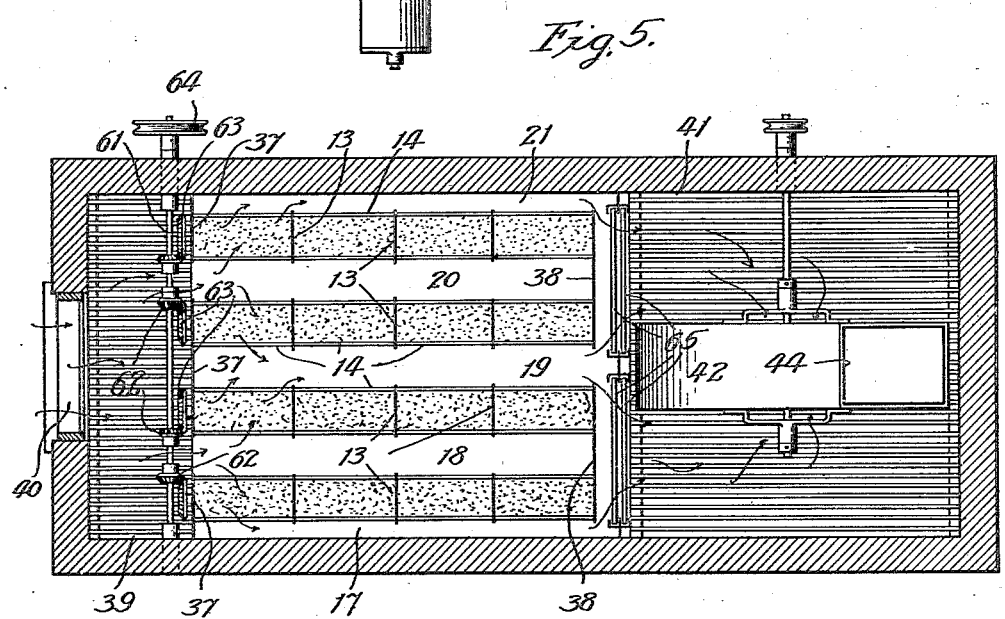

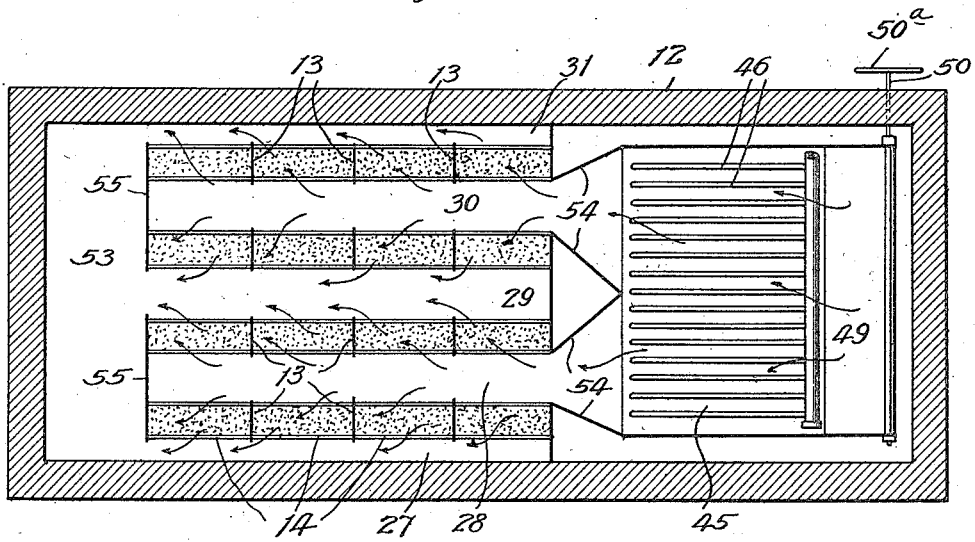
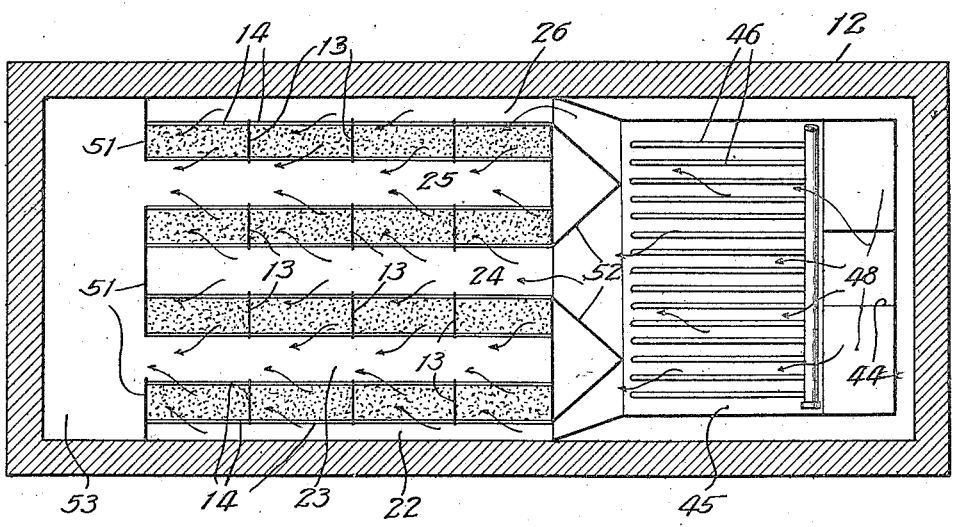

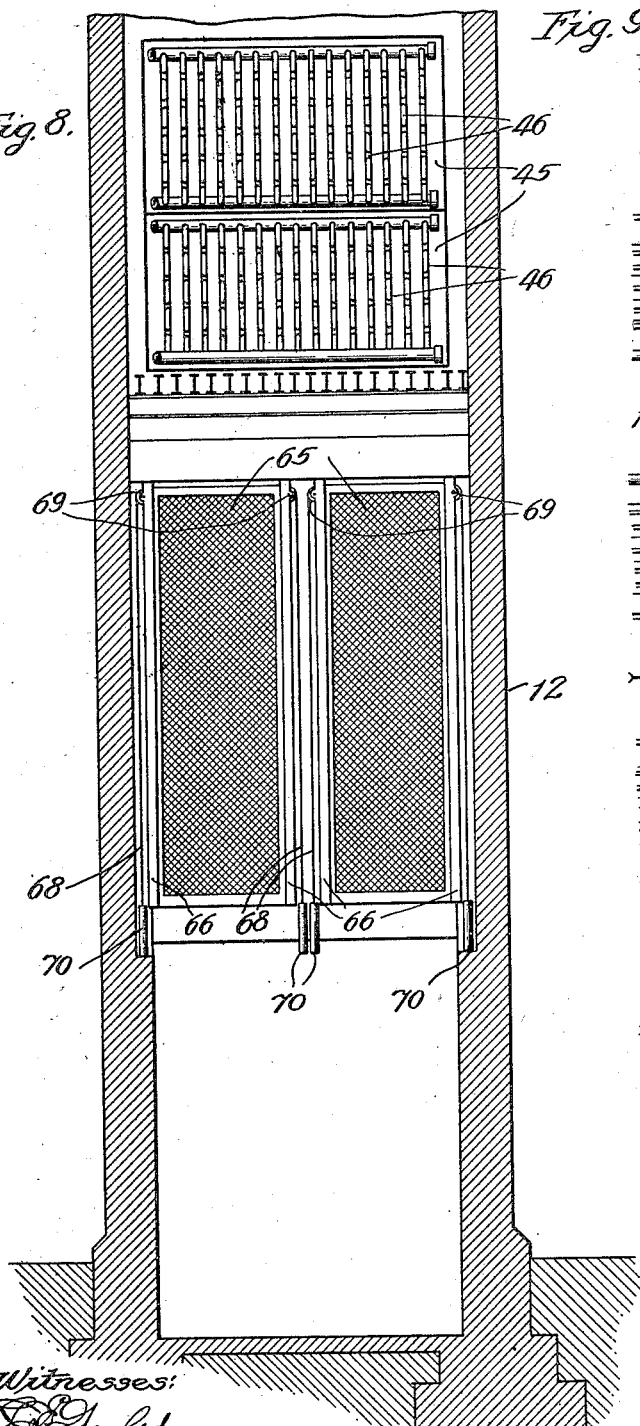
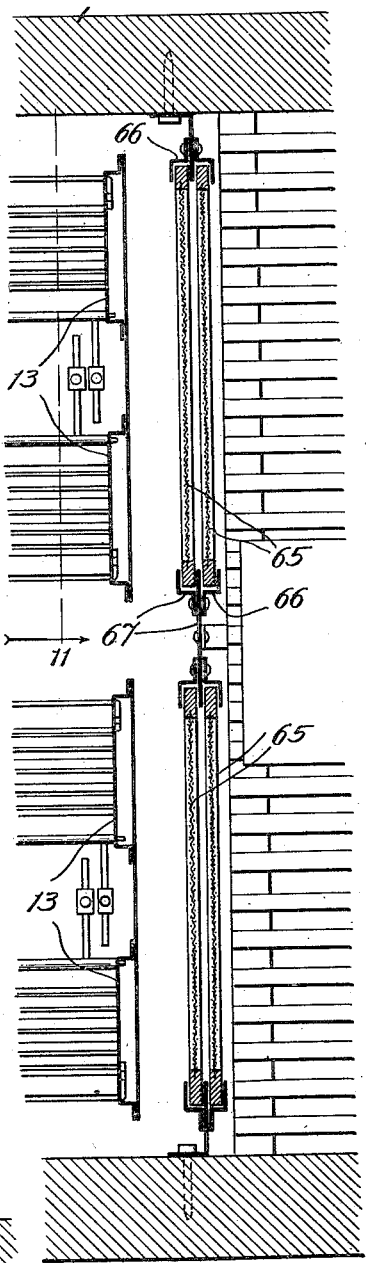

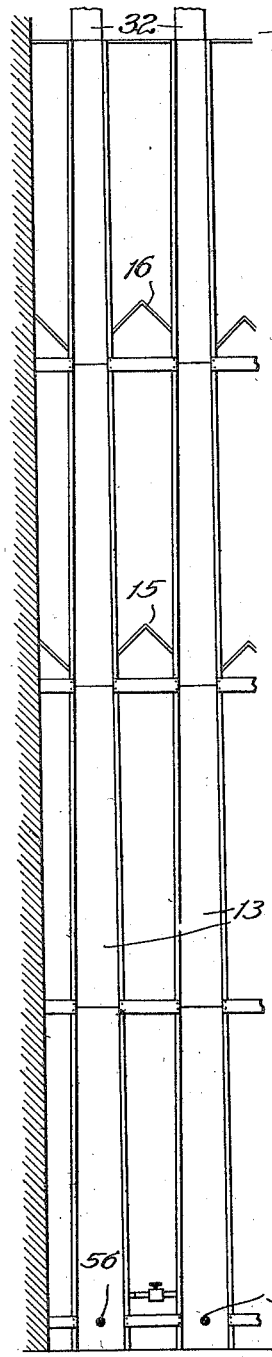
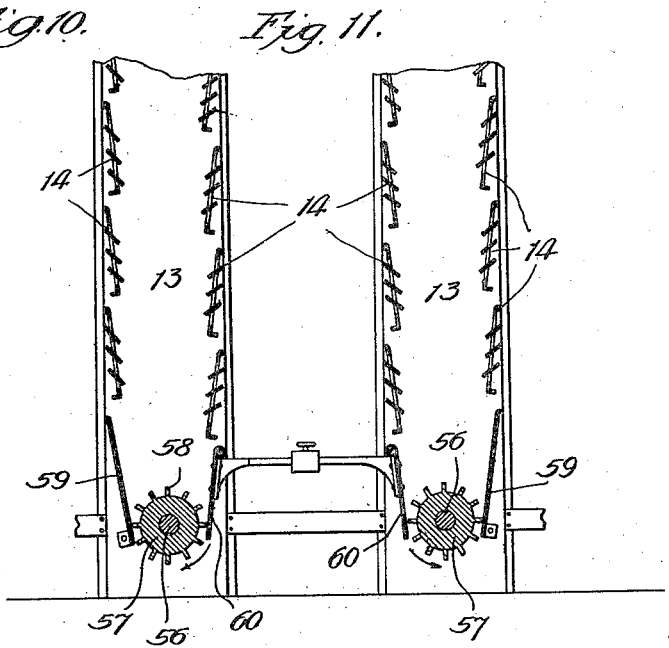

GEORGE H. HESS, OF LA GRANGE PARK, ILLINOIS.

APPARATUS FOR DRYING AND COOLING SUBSTANCES.

1,210,166.   Specification of Letters Patent.   Patented Dec. 26, 1916.

Application filed March 20, 1915. Serial No. 15,732.

*To all whom it may concern:*

Be it known that I, GEORGE H. HESS, a citizen of the United States, residing at La Grange Park, in the county of Cook and State of Illinois, have invented a new and useful Improvement in Apparatus for Drying and Cooling Substances, of which the following is a specification.

My invention relates to apparatus for drying and cooling substances in general required to be dried, but more particularly to the drying and cooling of substances, such as cotton-seed, which by reason of the character thereof will not readily flow through the racks, but will tend to hang therein.

My primary objects are to provide improvements in apparatus of the character referred to whereby it will be suitable for the treatment of substances having properties causing them to flow sluggishly, as for example, cotton seed, and by which such substances may be treated effectually and economically.

Referring to the accompanying drawings—Figure 1 is a sectional view in side elevation of a drying and cooling apparatus constructed in accordance with my invention, one side of the housing being removed, the section being taken at the line 1 on Fig. 2 and viewed in the direction of the arrow. Figs. 2, 3, 4, 5, 6, 7, 8 and 9 are sections taken, respectively, at the lines 2, 3, 4, 5, 6, 7, 8 and 9 on Fig. 1 and viewed in the directions of the respective arrows, Figs. 4 to 9, inclusive, being enlarged. Fig. 10 is a view in end elevation of two of the racks, the racks being viewed from the left-hand side of Fig. 5, with the end-plates of the racks removed; and Fig. 11, a broken section taken at the line 11 on Fig. 9 and viewed in the direction of the arrow.

In the particular construction illustrated, the racks for the material to be dried and cooled are shown as housed in a building 12 and are formed of series of upright plates 13 with louvered plates 14 connecting the plates 13 together and inclining inwardly in staggered relation as represented particularly in Fig. 11, the plates 14 by reason of their arrangement as illustrated, serving to permit of the passage of air through the racks from one side to the other thereof and consequently through the substances located in the racks, as hereinafter described. The racks thus provided are uprightly disposed and are spaced from each other horizontally as represented in Figs. 5, 6 and 7, in the arrangement illustrated wherein four racks are shown, five spaces being thus provided which are divided horizontally by partitions 15 and 16, the partitions 15 being about midway between the bottoms and tops of the racks and the partitions 16 about midway between the partitions 15 and the tops of the racks, the partitions 15 and 16 dividing the spaces between the racks hereinbefore referred to, into chambers 17 to 31, inclusive. The interior of the racks communicate at their upper ends which are upwardly tapered as represented at 32, with a conveyer tube 33 which extends transversely of the racks, the racks opening into this tube at intervals along the latter. The tube 33 is provided at one end with an opening 34 at which it is adapted to communicate with a garner containing material to be dried and cooled, and which is fed through the tube into registration with the several racks for discharging the material into the latter, by a spiral-screw conveyer 35 journaled in the tube 33 and driven in any suitable manner as through the medium of a pulley 36 thereon.

The passages 17, 19 and 21 are closed at the left-hand end of the apparatus and the passages 18 and 20 are closed at the right-hand end thereof, by plates represented at 37 and 38, respectively, the passages 18 and 20 opening into a chamber 39 formed in the housing 12 and open to the atmosphere through a window 40 in the housing, and the passages 17, 19 and 21, which form exhaust-passages, opening at the other end of the apparatus into a chamber 41 in the housing. The chamber 41 contains a blower 42 of any suitable construction and is operated in any desired manner, the inlet of which, represented at 43, communicates with the interior of the chamber 41, whereby when the blower 42 is actuated, cool air is drawn through the window 40 into the chamber 39, thence into the passages 18 and 20 and through the material in the racks, which is thereby cooled, thence into the passages 17, 19 and 21 and into the blower 42. The outlet of the blower 42 communicates with the conduit 44 which opens into a heating-chamber 45 divided horizontally into upper and lower sections by a partition 47 located in substantially the same plane as the partitions 16, the partition 47, however, reaching short of the end-wall of the chamber 45, as represented in Fig. 1, to form a passage 48 between the upper and lower sections of the chamber 45, said passage being controlled by a damper 49 mounted on a shaft 50 journaled in the wall of the housing, the shaft 50 being provided with any suitable means represented diagrammatically at 50ª for operating it to open and close the passage 48. The upper and lower sections of the chamber 45 each contain a heating coil 46, preferably independently connected (in a manner not shown) with a source of steam supply for causing the air passed therethrough to be heated to the same or different temperatures as desired.

The passages 22, 24 and 26 are closed at the left-hand end of the apparatus by plates 51 and the passages 23 and 25 are closed at the right-hand end thereof by plates 52, thus leaving the right-hand ends of the passages 22, 24 and 26 in open communication with the interior of the lower section of the heating-chamber 45 and the ends of the passages 23 and 25 at the left-hand end of the apparatus open to a chamber 53, which may communicate, as shown, with the atmosphere exterior of the housing 12. The passages 27, 29 and 31 are closed, at the right-hand end of the apparatus, to the interior of the heating-chamber 45, by means of plates 54; and the passages 28 and 30 are closed to the chamber 53 at the other end of the apparatus by plates 55, the passages 28 and 30 thus opening at the right-hand end of the apparatus into the upper section of the heating-chamber 45 and the passages 27, 29 and 31 opening at the other end of the apparatus into the chamber 53.

It will be understood from the foregoing that with the fan 42 in operation, cold air will be drawn into the chamber 39 through the window 40, thence into the spaces 18 and 20, through the racks and the material located therein, and thence into the exhaust-passages 17, 19 and 21 into the chamber 41 (Fig. 5), thus cooling the material in the lower part of the racks. The air thus utilized for cooling the substance in the racks, and which by reason of its contact therewith, becomes relatively hot, then enters the fan 42 and is discharged into the conduit 44, entering both the upper and lower sections of the chamber 45 if the damper 49 is open, or the lower section only of the said chamber if said damper is closed, the air entering the upper and lower sections of said chamber becoming heated by the steam coils therein to the desired temperature for drying the material in the upper portions of the racks. The air which is forced into the lower section of the chamber 45 enters the passages 22, 24 and 26, thence passes through the racks and the material located therein and out through the exhaust-passages 23 and 25 into the chamber 53, from which it escapes through the ventilator in the roof of the housing. The air which is forced through the upper section of the chamber 45 enters the spaces 28 and 30, thence passes through the racks and the material therein, passing thence into the exhaust-passages 27, 29 and 31 and then to the chamber 53, exhausting from the latter as above stated; it being noted that the course of the heated air through those portions of the racks which are fed with air from the upper section of the chamber 45, is in a reverse direction to that of the air fed to the racks through the lower section of the chamber 45, whereby the material to be dried may, during the drying operation, be subjected to air passed through it first in one direction and then in another.

In the particular construction of apparatus illustrated, the flow of material through the racks is controlled by mechanism which operates, preferably, by continuous movement to cause the substances in the racks to gradually descend therein, by a continuous movement, a description of a desirable form of such mechanism, especially where the substance being treated in the apparatus is cotton seed or the like, being as follows: Journaled in any suitable manner to extend through the lower ends of the racks longitudinally thereof are shafts 56 each provided with rollers 57 alternating with the walls 13; these rollers being provided about their peripheries with ribs 58 extending the full length thereof, there being provided in each rack closely adjacent to the peripheries of the rollers 57 converging plates 59 and 60, which, together with the walls 13 and the rollers 57 prevent the discharge from the racks of material therein, excepting as it is fed out of these racks and into a hopper 59 by rotating the ribbed rollers 57 through the medium of any suitable mechanism, as for example, that illustrated in Fig. 5, which involves a shaft 61 journaled in the housing 12 to extend transversely of the shafts 56 and provided with bevel pinions 62 meshing with bevel gears 63 secured to the shafts 56, the shaft being equipped with a pulley 64 at which it is adapted to be driven by any suitable mechanism (not shown).

In accordance with the preferred embodiment of my invention, those walls of the racks which are formed of the upright series of inclined louvered plates 14 are arranged in downwardly divergent position, as will be apparent from Figs. 10 and 11, to cause each rack to taper toward its upper end; and the plates 14 are preferably arranged slightly inclined at an angle to a vertical plane. By this arrangement, especially when combined with the means hereinbefore described for causing the material to descend gradually by a continuous movement, the material, even should it be cotton seed, or other material, which is comparatively sluggish, may be effectually dried and cooled, and the tendency to the hanging of the material in the racks producing interruption in the operation of the apparatus and packing of the material therein, is overcome, the material gravitating in the racks as the material is fed out of the racks under the action of the rollers 57.

Where the material to be treated in the apparatus is of such a character that lint is freed therefrom in its passage therethrough, it is desirable to intercept the lint which is discharged with the cooling air from the cooling portions of the racks, and this is accomplished in the particular construction illustrated by providing in the chamber 41, screens represented at 65, these screens which are provided in pairs, as illustrated in Fig. 9, being mounted to slide up and down in vertical grooves 66 in a framework 67 extending across the chamber 41 and closing communication between the latter and the exhaust-passages 17, 19 and 21, excepting through the openings in which the screens 65 are arranged, the screens being attached to cords 68 running over pulleys 69 on the frame-work 67 and carrying counterweights 70, whereby the screens may be lowered out of position for removing the lint when desired. It is also preferred that the conveyer tube 33 at the end thereof opposite that containing the opening 34 be provided with means for relieving said pipe of overflow therein should the conveyer 35 feed material to the racks faster than the discharge mechanism of which the rollers 57 are a part, operate to control the discharge of material from the racks, such means comprising a pipe 71 opening into the tube 33 and leading to any suitable receptacle.

While I have illustrated and described a particular construction embodying my invention, I do not wish to be understood as intending to limit it thereto, as the same may be variously modified and altered without departing from the spirit of my invention.

What I claim as new and desire to secure by Letters Patent is—

1. Apparatus of the character set forth, formed of a rack adapted to permit of the passage of air therethrough, with downwardly inclined plates adapted to support the material introduced into the rack, the inner ends of said plates extending short of the vertical median line of the rack, with the distances between the inner ends of adjacent plates gradually decreasing from the bottom to the top of the rack.

2. In apparatus of the character set forth, the combination of a rack adapted to permit of the passage of air therethrough, with downwardly inclined plates adapted to support the material introduced into the rack, the inner ends of said plates extending short of the vertical median line of the rack, with the distance between the inner ends of adjacent plates gradually decreasing from the bottom to the top of the rack, means providing continuous feed into said rack of material to be dried therein, and means providing for the continuous discharge of the material from the rack at a controlled rate of flow.

GEORGE H. HESS.

In presence of—
ALICE MASLEY,
FANNIE ROCHE.